March 3, 1953     F. H. McCORMICK ET AL     2,630,515
DOMESTIC APPLIANCE CONTROL Filed April 28, 1949     3 Sheets—Sheet 1

INVENTOR.
Francis H. McCormick
BY Robert R. Candor

Spencer Hardman and Fehr
Attorneys

March 3, 1953
F. H. McCORMICK ET AL
2,630,515
DOMESTIC APPLIANCE CONTROL
Filed April 28, 1949
3 Sheets-Sheet 2
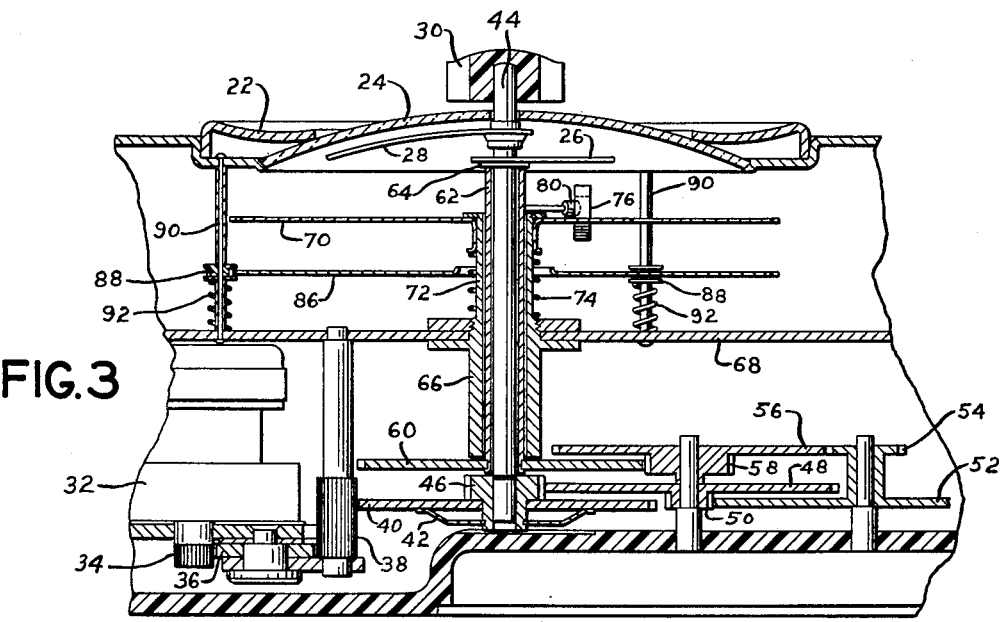
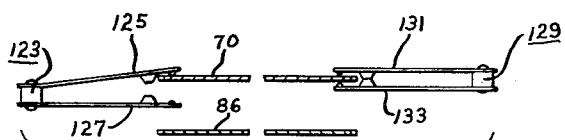
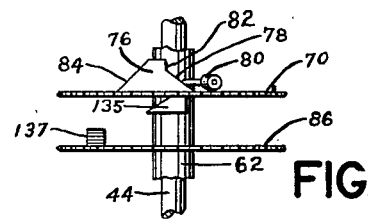
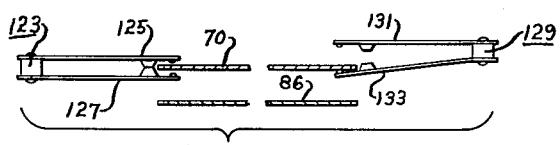
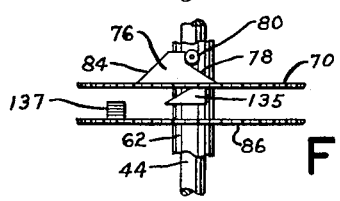
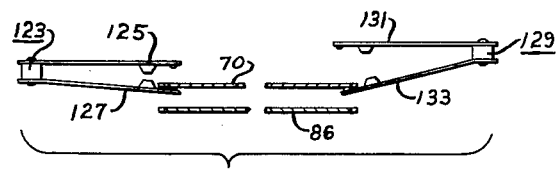
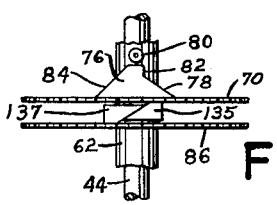
INVENTOR.
Francis H. McCormick
Robert R. Candor
BY
Spencer Hardman and Fehr
Attorneys March 3, 1953 F. H. McCORMICK ET AL 2,630,515
DOMESTIC APPLIANCE CONTROL
Filed April 28, 1949 3 Sheets-Sheet 3
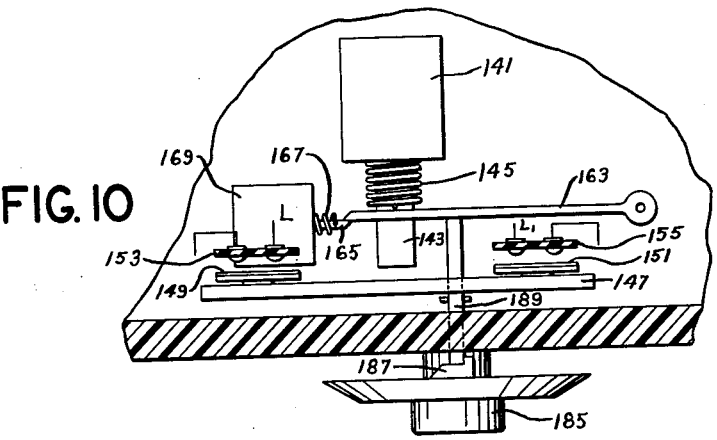
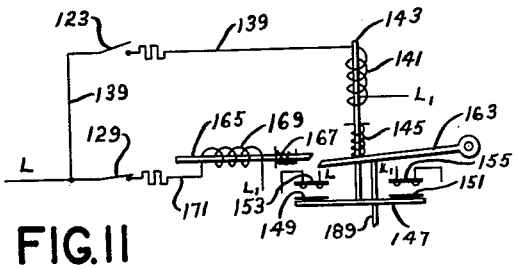
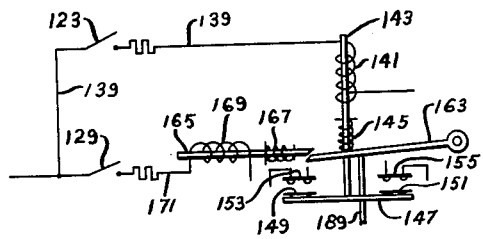
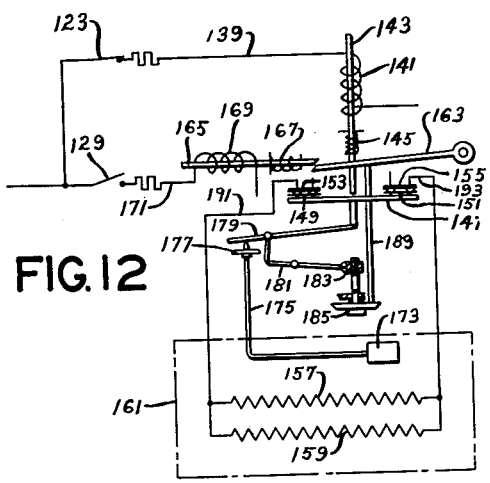
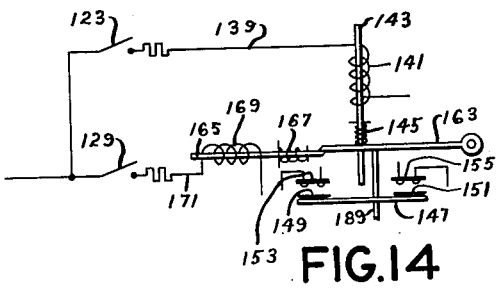
INVENTOR.
Francis H. McCormick
Robert R. Candor
BY
Spencer Hardman and Fehr
Attorneys Patented Mar. 3, 1953

2,630,515

UNITED STATES PATENT OFFICE 2,630,515

DOMESTIC APPLIANCE CONTROL

Francis H. McCormick and Robert R. Candor, Oakwood, Ohio, assignors to General Motors Corporation, Dayton, Ohio, a corporation of Delaware Application April 28, 1949, Serial No. 90,091

13 Claims. (Cl. 219—20)

Our invention relates to a domestic appliance and to other control applications wherein a clock timer automatically renders effective another automatic regulating device. More particularly in combination with a clock we provide a single knob actuatable to set a first combined indicating and control means to indicate and be rendered effective at the beginning of a time period and to set a second combined indicating and control means to indicate and be rendered effective at the end of such a timed period. The operation of the first control means energizes a first control circuit portion and a solenoid which instantaneously retracts a biasing means which is then latched to permit operation of an automatic regulating device, such as an adjustable thermostat in the normal manner until the second control means operates. The operation of the second control means energizes a second control circuit portion and a second solenoid to release the latch and the biasing means to terminate the control by the clock and to terminate the period of effective operation of the automatic regulating device. The movement of the adjustment of the automatic regulating device to the "off" position latches the biasing means to make possible the release of the automatic regulating device from the clock control.

It is an object of our invention to provide a control arrangement in which the single knob sets the beginning and the end of a time period and in which a second knob disconnects an automatic regulating device such as a thermostat from the timer control and also adjusts the automatic regulating device to the desired operating level.

It is another object of our invention to provide a clock control in which two indicating members serving to indicate the beginning and the end of a timed period also serve as actuating members for actuating two control functions of the clock control, such as two switches or two switch positions.

It is another object of our invention to provide a combined clock and temperature control in which the main switch contact mechanism is operated directly by the temperature control mechanism and the clock mechanism controls energize and deenergize the control circuits which in turn also control the main switch contact mechanism.

It is another object of our invention to provide a combined clock and adjustable temperature control in which the turning of the adjusting knob to one particular position, such as the "off" position, disconnects the clock control to permit the independent operation of the temperature control.

Further objects and advantages of the present invention will be apparent from the following description, reference being had to the accompanying drawings, wherein a preferred form of the present invention is clearly shown.

In the drawings:

Fig. 3 is a more extensive horizontal sectional view through the clock timer shown in Fig. 1;

Fig. 4 is a fragmentary partly diagrammatic sectional view showing the combined indicating and control means in the pre-set position;

Fig. 5 is a fragmentary view of other portions of the indicating and control means in the pre-set positions;

Fig. 6 is a view similar to Fig. 4, but with the indicating and control means at the position assumed at the beginning of the timed period;

Fig. 7 is a view similar to Fig. 5, but with the indicating and control means in the positions shown at the beginning of the timed period;

Fig. 8 is a view similar to Figs. 4 and 6 showing the indicating and control means in the positions assumed to terminate the timed period;

Fig. 9 is a view similar to Figs. 5 and 7 with the indicating and control means located at an angle of 90 degrees relative to Figs. 5 and 7, showing the location of the indicating and control means to terminate the timed period;

Fig. 10 is a view, partly diagrammatic, showing another portion of the invention including the automatic control which is electrically connected to the clock timer of the previous views;

Fig. 11 is a wiring diagram showing the control and circuit arrangement in the pre-set period;

Fig. 12 is a wiring diagram similar to Fig. 11 showing the circuit and control arrangement at the beginning of the timed period;

Fig. 13 is a wiring and control diagram similar to Figs. 11 and 12 with the control mechanism shown to terminate the timed period; and Fig. 14 is a view similar to Figs. 11 to 13 shown in the condition after the temperature adjusting knob has been turned to the "off" position, the wiring diagram includes a heating circuit for an oven.

Figure 1:
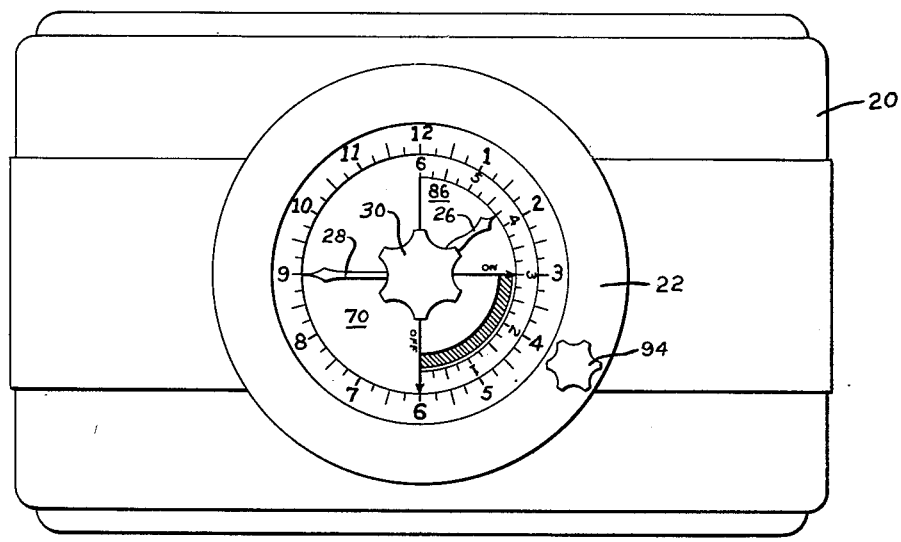
Fig. 1 is a front view of the clock timer disclosing a portion of our invention.
Figure 2:
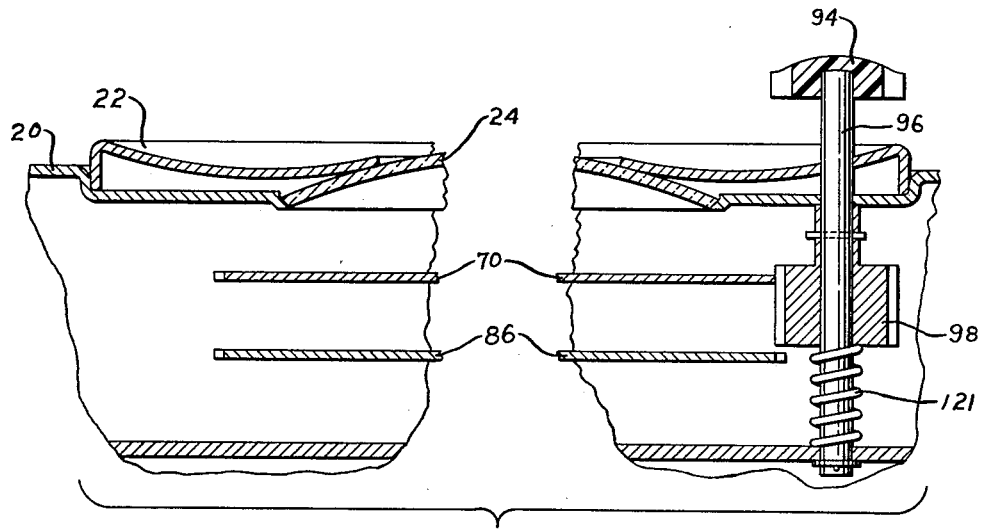
Fig. 2 is a horizontal sectional view through the dial portion of the clock timer shown in Fig. 1.

Referring now more particularly to Figs. 1 and 2, there is disclosed a clock timer 20 provided with a clock dial 22 carrying the conventional hour numerals. This clock dial holds the glass or transparent cover 24 in place. Beneath the glass cover 24 is an hour hand 26 and the minute hand 28. These may be set to the proper time by the setting knob 30 which protrudes from the front of the glass 24.

A suitable electric clock motor 32 has a driving pinion 34 which, through an idler gear 36 and an idler pinion 38, drives a large gear 40 which is held in a frictional driving arrangement 42 on the hour hand shaft 44. On the lower end of the hour hand shaft 44 is a pinion 46 which, through a series of reduction gears and pinions 48, 50, 52, 54, 56 and 58 drives a large gear 60. This large gear 60 is riveted to the lower end of the hour hand sleeve 62 which is concentric with the minute hand shaft 44 and rotates independently thereof. The hour hand 26 is carried at the upper end of the hour hand sleeve 62. The hour hand sleeve 62 is withheld from axial movement by a disk 64 fixed to the minute hand shaft 44 at the upper end of the sleeve 62 and by the large gear 60 which is prevented from upward movement by the bearing support 66 fastened to the dividing wall 68.

Above the dividing wall 68, the bearing structure 66 is provided with a long bearing 72 on which the first combined indicating and control disk 70 is mounted. This first disk 70 is yieldingly urged against the flange at the upper end of the bearing 72 by a light coil spring 74. This first disk 70 carries an upwardly projecting lug 76 having an inclined cam portion 78 facing in a counterclockwise direction to receive the cam roller 80 mounted upon the end of an arm projecting from the hour hand sleeve 62. The inclined cam surface 78 terminates in a vertical surface 82. The rear face of the lug 76 is provided with an inclined cam surface 84.

Beneath the first indicating and control disk 70 is a second indicating and control disk 86 having a central opening to provide clearance for the spring 74. This second control disk 86, like the first control disk 70, has gear teeth upon its outer periphery. To support this second control disk 86 there are provided three flanged idler pinions 88 mounted upon pins 90 between sleeves so as to firmly hold the second disk in its proper location, but to permit rotation. However, to make possible the coacting camming action to be later described, the sleeves are provided with coil springs 92 beneath the pinions 88 to impose a limited amount of friction upon their rotation and the rotation of the second disk 86 to provide sufficient force to accomplish the coacting camming action desired.

According to our invention a single knob 94 controls the setting of both disks 70 and 86. The knob 94 is connected to a shaft 96 to which is pinned a pinion 98. The shaft 96, the knob 94 and the pinion 98 are yieldingly urged outwardly by a coil spring 121. The pinion 98 has a face which is sufficiently wide to mesh with the gear teeth on the periphery of both of the disks 70 and 86. In the outermost position of the knob 94 shown in Fig. 2 the pinion 98 only meshes with the first disk 70, while in the innermost position of the knob 94, the pinion 98 only meshes with the second disk 86. By this arrangement only a single knob is required to set both the starting and the end of the timed period.

The first and second disks 70 and 86 are preferably provided with indications and apertures of the type disclosed in the Candor Patent No. 2,361,262 issued October 24, 1944. As shown in Fig. 1 the disk 70 has a semi-circular opening bordered by a scale extending counterclockwise from 0 to 6. The zero position is provided with an arrow and a legend "off" which indicates the termination of the timed period. The second disk 86 also has a semi-circular opening, one half of which is shown. It is provided with an "on" legend indicating the beginning of a timed period. The scale bordering the edge of the semi-circular opening on the disk 70 indicates the duration of the time period in cooperation with the legend "on" provided on the second disk 86. This legend "on" also points to the hour at which the timed period is scheduled to begin.

To set the clock to start a timed period, it is merely necessary to turn the knob 94 until the "off" legend is at the hour at which it is desired to complete the timed period. As an example, 6:00 p. m. is clearly indicated in Fig. 1. Then the knob 94 is pushed inwardly so that the pinion 98 will become disengaged from the gear teeth on the periphery of the first control disk 70 and become engaged with the gear teeth of the second control disk 86. The second control disk 86 is then turned until the legend "on" is directed to indicate the length of the time period as indicated by the counterclockwise scale. This will also indicate the beginning of the timed period. In Fig. 1, the length of time is indicated as three hours by the legend "on" which also indicates the starting time as 3:00 p. m. The clock timer merely by this setting of the two disks 70 and 86 by the single control knob 94 will be set to provide the timed period. It is assumed that this setting takes place at the time indicated on the clock timer in Fig. 1, namely 1:45 p. m. After this setting at 1:45 p. m. the location of the disks, the cam surfaces and the cam roller are as shown in Figs. 4 and 5.

The disk 70 as shown in Figs. 4, 6 and 8 actuates a switch contact mechanism 123 having an upper blade 125 and a lower blade 127 each carrying a contact button. The disk 70 also actuates a second switch mechanism 129 having an upper blade 131 and a lower blade 133. The upper blades 125 and 131 contact the upper side of the first disk 70 while the lower blades 127 and 133 contact the lower side of the first disk 70. When the disk 70 is exactly parallel to both blades of one of the switch mechanisms, that switch mechanism will be closed, as indicated in Figs. 4 and 6. When the first disk 70 is not parallel to both blades of one or both of the switch mechanisms, that switch mechanism or both switch mechanisms 123 and 129 will be open. In Fig. 4, which indicates the position of the disks 70 and 86 immediately after the setting, for example, at 1:45 p. m., the switch 129 is closed while the switch 123 is opened. This is because the first control disk 70 is in its uppermost position against the stop at the upper end of the bearing 72.

After setting, the disks and their cams remain stationary until the slow movement of the cam roller 80 upon the hour hand sleeve 62 makes engagement with and rolls up the sloping surface 78 upon the cam lug 76 thereby forcing the first disk 70 downwardly an amount substantially equal to the height of the sloping surface 78. This engagement or coaction is completed by 3:00 p. m., when the disks and the cams and the cam roller assume the positions shown in Figs. 6 and 7. The cam roller 80 is thus lodged against the vertical cam surface 82. This causes the cam roller 80 to carry the cam lug 76 and the first disk 70 along with it in its rotation at hour hand speed, but the second disk 86 is not driven and is not rotated during this period, so that arc between the "on" and "off" positions decreases. The coaction of the cam roller 80 with the sloping cam surface 78 has lowered the first disk 70 sufficiently that it bears upon the lower spring blade 133 of the switch contact mechanism 129 to separate these contacts. It, however, brings the position of the first disk 70 to a location wherein it is parallel with both blades 125 and 127 of the switch mechanism 123, so that these contacts are now closed. Since the first disk 70 is in such a location that it does not touch either blade and the spring force inherent in the blades 125 and 127 holds the contact buttons in engaged position.

The first disk 70 continues to be carried by the cam roller 80 at hour hand speed until it approaches the end of the time period which is set for 6:00 p. m. The lower face of the first disk 70 is provided with a second cam lug 135. The second disk 86 is provided with a complementary lug 137 which projects upwardly from the disk 86 a sufficient distance to engage and coact with the cam lug 135 when the first and second disks 70 and 86 are positioned as shown in Fig. 6. The cam faces on the lugs 135 and 137 are sloped so that their engagement will cam the first disk 70 toward the second disk 86 as illustrated in Figs. 8 and 9. This permits the cam roller 80 to pass over the lug 76 and continue uninterrupted operation. It also causes the cam disk 70 to hold open both the switch mechanisms 123 and 129. This is the normal condition of the clock when no time period is desired. It should be noted that the friction upon the pinions 88 must be sufficient to resist the rotation of the second disk 86 sufficiently that the camming action between the lugs 135 and 137 will take place as shown in Fig. 9 to free the cam roller 80 from the lug 76.

Referring now more particularly to Figs. 11 to 14, there is shown a control circuit portion 139 which includes the control switch means 123 and a solenoid 141. When energized, this solenoid lifts an armature 143 which is normally biased downwardly by a compression coil spring 145 as shown in Fig. 11. When biased by the spring 145, the armature pushes open the main switch bar 147 having contact bridge elements 149 and 151 at the opposite ends thereof. These bridge elements 149 and 151 are adapted to bridge two pairs of stationary contacts 153 and 155 which break both sides of the supply conductor to the device to be controlled, such as any suitable form of temperature changing means. For example, this main switch bar may be used to control the supply of electric energy to the heating elements 157 and 159 of an electric oven 161.

When the armature 143 is energized by the solenoid 141, it will lift a pivoted latch member 163 into latching engagement with the latch bar 165. The latch bar 165 is normally biased into latching position by a spring 167. It may be retracted out of latching engagement by the energization of the solenoid 169 connected in a second control circuit portion 171 under the control of the switch means 129.

To regulate the temperature within the oven 161 for example, there is provided a thermostatic switch means. This switch means includes a thermostat bulb 173 in heat exchange relation with the oven 161. This bulb 173 is connected by a tube 175 with a fluid motor or diaphragm means 177. This diaphragm means 177 operates a switch lever 179 which is connected to operate the main switch bar 147. This switch mechanism is provided with a suitable temperature adjustment of any desirable type. According to the drawing the adjustment is made by pivoting the main switch lever 179 onto the end of an adjustable lever 181. The opposite end of this adjustable lever 181 is adjusted by a nut 183 which is moved by an adjusting screw provided with a control knob 185. The control knob 185 is provided with a cam element 187 which in the "off" position is adapted to engage the push rod 189 to cause this push rod 189 to move the latch lever 163 into latching position as shown in Fig. 10.

Upon the closing of the switch 129 at 1:45 p. m. the circuit portion 171 and the solenoid 169 are energized to retract the latch element 165 as shown in Fig. 11 to release the lever 163. This renders effective the biasing spring 145 which moves the armature 143 into engagement with the main switch bar 147 to open both supply conductors 191 and 193.

At 3:00 o'clock the switch 129 is opened and the switch 123 is closed thereby deenergizing the circuit portion 171 and the solenoid 169 and energizing the circuit portion 139 and the solenoid 141 to cause the armature 143 to be attracted and moved away from the main switch 147 to compress the biasing spring 145. The oven 161 is now placed in control of the thrmostat switch means 173, 177 and 179, which will lift the main switch bar 147 to closed position and keep it there until the temperature level for which the knob 185 is set will be attained. The heating elements 157 and 159 will be cycled by the switch mechanism which will open and close the main switch bar 147 to keep the oven 161 at the set temperature until 6:00 p. m.

At 6:00 p. m. the switch 123 will be opened so that both solenoids will then be deenergized. Since at 3:00 p. m. switch 129 was opened before the switch 123 was closed, the latch lever 163 remained during this three hour heating period in the unlatched position. Therefore, when the switch 123 is opened at 6:00 p. m., the biasing spring 145 is released to move the armature 143 into engagement with the main switch bar 147 to push the bridge elements 149 and 151 to the open circuit position. This terminates the period during which the oven 161 is under the automatic regulation of the thermostatic switch means. At some later time, for example, 6:30 p. m., when it is desired to use the oven for other purposes, the thermostat control knob 185 is returned to the "off" position as shown in Fig. 10. Thereafter knob 185 may be turned to any suitable temperature adjustment to place the oven 161 under the sole control of the thermostatic switch means 177 and 179.

In the operation of the invention, assume that the user, at 1:45 p. m. adjusts the thermostat to a baking temperature, such as 350° F., by turning the knob 185. The user also sets the timer to start cooking "on" at 3:00 p. m., and to stop cooking "off" at 6:00 p. m. This adjustment is accomplished by pushing down and turning knob 94 to adjust "off" disk 86 to 6:00 p. m. and then pulling up and turning knob 94 to adjust the "on" disk to 3:00 p. m. This establishes the circuit as indicated in Fig. 11.

Ordinarily the setting of the thermostat to 350° F. would close the thermostat contacts 149 against the contacts 153, 155 to heat the oven;

but the adjustment of the timer to the 3 to 6 p. m. positions automatically opens the thermostat contacts by closing of switch A, energizing solenoid 169 and releasing plunger 143. At 3:00 p. m. the circuit shown in Fig. 12 is established, and the consequent energization of solenoid 141 retracts plunger 143 to allow the thermostat contacts 149 to close and to be thereafter cycled in response to oven temperatures until 6:00 p. m. At 6:00 p. m. the circuit of Fig. 13 is established, and the deenergization of solenoid 141 releases plunger 143 to open the thermostat contacts. The thermostat contacts remain open until the user deliberately turns the thermostat back to "off," such as at 6:30 p. m., as shown in Figs. 10 and 14, thus causing rod 189 to latch the lever 163 and plunger 143 out of the way of the thermostat contacts. Thereafter the thermostat may be operated independently of the timer, until the time is again reset.

The subject matter of the present application is related to that of Serial No. 669,203, filed May 11, 1946, now Patent 2,606,991, and to that of Serial No. 218,413, filed March 30, 1951, both having the same assignee as this application. The subject matter of the present application is also related to the following copending patents and applications owned by the same assignee: S. N. 610,998 filed August 17, 1945, Pat. No. 2,471,862 granted May 31, 1949, Robert R. Candor, inventor; S. N. 618,680 filed September 26, 1945, Pat. No. 2,483,526 granted October 4, 1949, Robert R. Candor, inventor; S. N. 662,776 filed April 17, 1946, Pat. No. 2,529,913 granted November 14, 1950, Robert R. Candor, inventor; S. N. 90,092 filed April 28, 1949, Pat. No. 2,587,187 granted February 26, 1952, Francis H. McCormick, inventor; S. N. 94,973 filed May 24, 1949, Pat. No. 2,596,039 granted May 6, 1952, Francis H. McCormick, inventor; S. N. 662,777 filed April 17, 1946, Robert R. Candor, applicant, copending with this application, but now abandoned. The above patents and applications are related to the present application in that they have disclosures in common.

While the form of embodiment of the invention as herein disclosed, constitutes a preferred form, it is to be understood that other forms might be adopted, as may come within the scope of the claims which follow.

What is claimed is as follows:

1. A temperature controlling arrangement including a fluid to be thermally controlled, temperature changing means for said fluid, a clock, a thermostat responsive to the temperature of said fluid for controlling said temperature changing means, said thermostat having a movable control movable to off and operating positions for setting said thermostat to prevent the activation and to activate the temperature changing means as desired, said clock having a first settable means coordinated with the operation of said clock to place said temperature changing means under the joint control of said thermostat and said clock and a second settable means coordinated with the operation of said clock to remove said temperature changing means from the joint control by said thermostat and said clock, and interlocking means interconnecting the movable control and the settable means responsive to the movement of said movable control to the off position for positively locking said settable means out of effective operation for placing said temperature changing means under the sole operating control of said thermostat.

2. A controlling arrangement including a clock having a shaft means and an hour hand driven by the shaft means and a dial cooperating with the hour hand to indicate the time, a first rotatable member provided with a first indicating means cooperating with the dial for indicating the beginning of a timed period, a second rotatable member provided with a second indicating means cooperating with the dial for indicating the end of the timed period, coacting engaging means upon said shaft means and said first rotatable member for moving said first rotatable member in both axial and rotatable movements, coacting engaging means upon said first and second rotatable members for moving the first member axially relative to the second member and for causing the second member to be rotated with the first member, and control means operated by the axial movement of the first rotatable member, a main switch means, a thermostatic means for moving said main switch means to closed position, said control means including means effective in one axial position of said first rotatable member for preventing the closing of said main switch means preceding the timed period and means effective in a second axial position of said first rotatable member for preventing the closing of the main switch means after the end of the timed period.

3. A controlling arrangement including a single switch contact means, a biasing means for opening said single switch contact means, an adjustable timer clock control having latching means for latching said biasing means and means for moving said biasing means to the latching position to render said biasing means ineffective and means for releasing said latching means, and an adjustable thermostatic means for operating said single switch contact means to closed position when said biasing means is rendered ineffective.

4. A controlling arrangement including a single switch contact means, a biasing means for opening said single switch contact means, an adjustable timer clock control having latching means for latching said biasing means and means for moving said biasing means to the latching position to render said biasing means ineffective and means for releasing said latching means, an adjustable thermostatic means for operating said switch contact means to closed position when said biasing means is rendered ineffective, said adjustable thermostatic means having an adjusting means and means effective in one position of the adjusting means for moving said biasing means to said latching position.

5. A controlling arrangement including a single switch contact means, a biasing means for opening said single switch contact means, latching means for latching said biasing means to render said biasing means ineffective for opening said single switch contact means, means for releasing said latching means to render said biasing means effective for opening said single switch contact means, a thermostatic means for operating said single switch contact means to closed position when said biasing means is ineffective, said thermostatic means having an adjusting means and means effective in one position of said adjusting means for moving said biasing means to latching position.

6. A controlling arrangement including a main switch means, a biasing means for opening said main switch means, latching means for latching said biasing means to render said biasing means ineffective for opening said main switch means, a first electrical operating means for releasing said latching means to render the biasing means effective for opening said main switch means, a second electrical operating means for moving said biasing means to latching position, and thermostatic means for moving said main switch means to closed position when said biasing means is ineffective.

7. A controlling arrangement including a main switch means, a biasing means separate from the main switch means having an effective condition for opening said main switch means and an ineffective position where it is ineffective to open said main switch means, latching means for latching said biasing means in an ineffective position to render said biasing means ineffective for opening said main switch means, a first electrical operating means for releasing said latching means to render the biasing means effective for opening said main switch means, a second electrical operating means for moving only said biasing means to latching position without moving the main switch means, means for moving said main switch means to closed position when said biasing means is ineffective, a second switch means for controlling said first electrical operating means, a third switch means for controlling said second electrical operating means, and timing means for controlling said second and third switch means.

8. An electric oven control, thermostatically controlled as to temperature and selectively operable as to time, comprising; an oven; an electric heater for said oven, a thermostat responsive to the temperature in the oven, an electric switch controlling said heater and operated by said thermostat, a control circuit for said electric switch, a timer adjustable to open and close said control circuit at pre-selected time, said switch having electrically operated latch means controlled by said timer through said control circuit for selectively holding when released the switch in the open circuit position, or when latched, permitting the thermostat to close and open said switch, a thermostat setting dial for adjusting said thermostat to various operating temperatures and to off position, and means on said dial when turned to the off position rendering said latch means ineffective to open said switch, until said timer is reset.

9. A controlling arrangement including a thermostatic operating means, a main switch means operably connected to said thermostatic operating means, a clock having a shaft means and an hour hand driven by the shaft means and a dial cooperating with the hour hand to indicate the time, a first rotatable means provided with a first indicating means cooperating with the dial for indicating the beginning of a timed period, a second rotatable means provided with a second indicating means cooperating with the dial for indicating the end of the timed period, a biasing spring means having an effective position for effectively holding open said main switch means regardless of the condition of the thermostatic operating means, a latch means for holding said biasing spring means in a latching position ineffective to hold open said main switch means, means responsive to the coaction between the first rotatable means and said shaft means for moving said biasing spring means into latching position, and means responsive to the coaction between the second rotatable means and said shaft means for operating said latch means to releasing position to release said biasing spring means.

10. A controlling arrangement including a thermostatic operating means, a main switch means operably connected to said thermostatic operating means, a clock having a shaft means and an hour hand driven by the shaft means and a dial cooperating with the hour hand to indicate the time, a first rotatable means provided with a first indicating means cooperating with the dial for indicating the beginning of a timed period, a second rotatable means provided with a second indicating means cooperating with the dial for indicating the end of the timed period, a biasing spring means having an effective position for effectively holding open said main switch means regardless of the condition of the thermostatic operating means, a latch means for holding said biasing spring means in a latching position ineffective to hold open said main switch means, means responsive to the coaction between the first rotatable means and said shaft means for moving said biasing spring means into latching position, and means responsive to the coaction between the second rotatable means and said shaft means for operating said latch means to releasing position to release said biasing spring means, said thermostatic operating means including a temperature adjusting means for various temperatures and an off position, and means responsive to the movement of the temperature adjusting means to the off position for moving said biasing spring means into latching position.

11. A controlling arrangement including a thermostatic operating means, a main switch means operably connected to said thermostatic operating means, a clock having a shaft means and an hour hand driven by the shaft means and a dial cooperating with the hour hand to indicate the time, a first rotatable means provided with a first indicating means cooperating with the dial for indicating the beginning of a timed period, a second rotatable means provided with a second indicating means cooperating with the dial for indicating the end of the timed period, a biasing spring means having an effective position for effectively holding open said main switch means regardless of the condition of the thermostatic operating means, a latch means for holding said biasing spring means in a latching position ineffective to hold open said main switch means, a first electrically operable means for moving said biasing spring means into latching position, switch means responsive to the coaction between said first rotatable means and said shaft means for energizing said first electrically operable means, a second electrically operable means for moving said latch means to releasing position for releasing said biasing spring means, and a second switch means responsive to the coaction between said first rotatable means and said shaft means for energizing said second electrically operable means.

12. A temperature controlling arrangement including a fluid to be thermally controlled, temperature changing means for said fluid, a clock, a thermostat responsive to the temperature of said fluid for controlling said temperature changing means, said thermostat having a movable control movable to off and operating positions for setting said thermostat to prevent the activation and to activate the temperature changing means as desired, said clock having a first settable means coordinated with the operation of said clock to place said temperature changing means under the joint control of said thermostat and said clock and a second settable means coordinated with the operation of said clock to remove said temperature changing means from the joint control by said thermostat and said clock, and latch means for preventing the settable means from exercising control over the temperature changing means, and means directly responsive to the movement of the movable control to the off position for latching said latch means.

13. A temperature controlling arrangement including a fluid to be thermally controlled, temperature changing means for said fluid, a clock, a thermostat responsive to the temperature of said fluid for controlling said temperature changing means, said thermostat having a movable control movable to off and operating positions for setting said thermostat to prevent the activation and to activate the temperature changing means as desired, said clock having a first settable means coordinated with the operation of said clock to place said temperature changing means under the joint control of said thermostat and said clock and a second settable means coordinated with the operation of said clock to remove said temperature changing means from the joint control by said thermostat and said clock, and latch means for preventing the settable means from exercising control over the temperature changing means, operating means for operating said latch means to latching position, said control being provided with cam means effective in the off position to operate said operating means.

FRANCIS H. McCORMICK.
ROBERT R. CANDOR.

REFERENCES CITED

The following references are of record in the file of this patent:

UNITED STATES PATENTS

| Number | Name | Date |
| --- | --- | --- |
| 1,253,893 | Scholl | Jan. 15, 1918 |
| 1,745,420 | Hewitt | Feb. 4, 1930 |
| 2,208,956 | Allenbaugh | July 23, 1940 |
| 2,217,226 | Lux | Oct. 8, 1940 |
| 2,259,188 | Whitehead | Oct. 14, 1941 |
| 2,300,950 | Lux | Nov. 3, 1942 |
| 2,302,625 | Gallagher et al. | Nov. 17, 1942 |
| 2,364,184 | Baak | Dec. 5, 1944 |
| 2,392,166 | Lockwood | Jan. 1, 1946 |
| 2,416,084 | Candor | Feb. 18, 1947 |
| 2,458,853 | Hughes | Jan. 11, 1949 |
| 2,499,270 | Ellis | Feb. 28, 1950 |